March 14, 1944.     O. VIERLING ET AL     2,344,117

METHOD OF MAKING POLARIZING FILTERS

Filed June 27, 1940

Inventors:
Otto Vierling &
Paul Gänswein

By *Al Holcombe*
Attorney.

Patented Mar. 14, 1944

2,344,117

UNITED STATES PATENT OFFICE 2,344,117

METHOD OF MAKING POLARIZING FILTERS

Otto Vierling and Paul Gänswein, Dresden, Germany; vested in the Alien Property Custodian Application June 27, 1940, Serial No. 342,708
In Germany December 9, 1938

1 Claim. (Cl. 88—65)

The invention relates to polarizing filters and particularly is directed to a novel method of making the same.

It is known to make polarizing filters from dichroitic monocrystal layers and protect the same against exterior influences by cementing the same between two glass plates. According to another method minute dichroitic crystals are embedded or produced within an isotropic carrier medium which preferably is initially in a semi-fluid condition permitting the produced mixture to be poured out in the form of a layer. At the same time the dichroitic particles are uniformly positioned to orient themselves in the same general direction by subjecting them to mechanical, electrical or magnetic forces. Such polarizing filters may be made of various known dichroitic crystals, for instance the iodine addition products of quininesulphate (herapathite), the iodine addition compounds on other heterocyclic bases, as for instance toluidine, cinchonine, picoline, quinoline, quina-aldine etc. In place of iodine it is also possible to employ bromine or metallic salts with heterocyclic bases. As carrier substance of initially fluid consistency for these small crystals preferably cellulose or derivatives of cellulose, gelatine, artificial resins etc. are used.

Another known method for making dichroitic polarizing filters consists in suitably dyeing optically anisotropic bodies, preferably anisotropic layers. It is, for instance, possible to treat a cellulose fibre of a thickness of not more than $1\mu$ with chloride of zinc iodine and thereby impart to the fibre such pronounced dichroism that the fibre in polarized light when positioned lengthwise parallel to the plane of polarization appears to be entirely colorless, but that it appears black when the fibre is positioned to traverse the plane of polarization. There exist a multiplicity of possibilities in the selection of anisotropic bodies of relatively great areal extent which are adapted when dyed to form polarizing filters and there is also a great number of dyes available for this purpose. Particularly adapted for this purpose are foils made from cellulose or cellulose derivatives which are obtainable at the present time on the market under different trade names, as Cellophane, Transparit, Cuprophane, Ulfraphane, Pliaphane etc. Artificial resins, gelatine and other substances likewise may be used. The number of dyes which will produce the desired results is quite large. Among others a great number of idiochromatic or allochromatic substances may be used, as methylene blue, Congo red etc. and all elements as copper, silver, gold, mercury, arsenic, antimony, bismuth, selenium, tellurium, bromine, iodine and others, as well as compounds of the same. It is also well known that it is feasible to start with ordinary isotropic bodies and render the same anisotropic by suitable treatments, for instance by stretching or thinning. When foils are employed which possess inherently anisotropic properties, it is in many cases of value to increase the anisotropic condition by stretching or thinning the foils. In certain cases, however, such special treatment can be entirely dispensed with.

A very suitable dye for treating foils of cellulose or of cellulose derivates to render the same dichroitic is iodine. The iodine preferably is introduced into the foil indirectly from the chloride of zinc iodine, or by displacing it from potassium iodine by gaseous chlorine, or it may be introduced in the form of other well known organic or inorganic iodine compounds.

Polarizing foils produced in the above described manner have a very limited durability only, since the dye disappears relatively fast from the carrier by itself and particularly by sublimation.

It is an object of the present invention to increase the durability of polarizing filters made by dyeing an optically anisotropic carrier layer.

Another object of the invention is to increase or improve the polarizing property of the above named polarizing filters.

In accordance with the present invention the optic anisotropic carrier layer is first thoroughly dyed throughout the whole body so that the dye penetrates the entire layer, and then the dye content of the layer is reduced again to the desired density or transparency. This reduction of the dye may, for instance, be obtained by washing a portion of the dye out of the layer. In this manner a polarizing layer is obtained in which the dye is seated principally in the intermediate part, the innermost portion of the layer. A polarizing filter produced in this manner has greater durability than the polarizing filters as heretofore produced, and in addition, it also has increased polarizing power.

The excess dye may also be eliminated from the foil by the action of heat or by the action of chemical substances. Apparently these steps are effective in positioning the dye principally within the innermost stratum of the foil, while the outer strata of the foil are substantially cleared of dye.

After the foil has been thoroughly dyed and then has been washed to remove the excess dye, the foil may be further improved by suitably stretching the same while still wet so as to increase its anistropic qualities. Preferably, the foil remains stretched i. e. under tension until it is completely dried. Owing to the drying step the tension in the foil is still more increased. Therefore, the stretching of the wet foil is preferably determined so that the final tension set up in the foil during the drying period will stay just below the limit of the tensile strength of the material.

To more fully illustrate the invention the accompanying drawing shows a polarizing filter in various stages of manufacture.

Figure 1:
Fig. 1 is a sectional view of an anisotropic carrier layer used in forming the polarizing filter.
Figure 2:
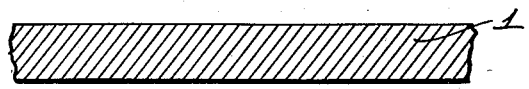
Fig. 2 is a view similar to Fig. 1 and shows the carrier layer after dyeing.
Figure 3:
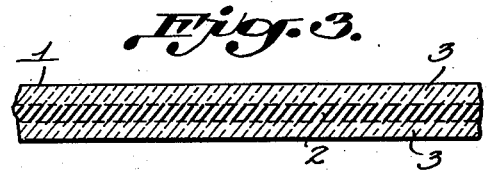
Fig. 3 is a view similar to Fig. 2 and shows the completed filter.

The anisotropic carrier layer used in forming the polarizing filter is designated by the reference numeral 1 and in Fig. 2 the layer is shown after excessive dyeing. Fig. 3 shows the finished filter wherein the dye has been removed from the outer portions 3 of the layer 1 to leave a central dyed portion 2 between these outer portions.

The method of making polarizing filters according to the present invention may also be practiced in such a manner, that the various steps as dyeing, washing and stretching are repeated in any desired sequence, for instance the carrier layer may be stretched to a certain degree before the dyeing takes place, and then the layer may be stretched again, even repeatedly, after it has been dyed. Likewise the dyeing may be repeated after each stretching operation. The polarizing filters produced in this manner are extremely effective and durable. The method of the invention is not limited to the use of iodine as dye, since other dyestuffs also may be employed with good result.

What we claim is:

In a method of making a polarizing filter wherein an optically anisotropic carrier layer is dyed with a substance which imparts a polarizing property to the carrier layer, the improvement which comprises increasing the durability of such filter by subjecting the carrier layer to dyeing with a dye until the carrier layer is dyed substantially throughout its entirety to a substantially uniform degree of intensity but which intensity is of a degree greater than that desired for the completed filter and which consequently renders the carrier layer transparent to a lesser degree than the degree of transparency desired for the completed filter, and then subjecting the dyed carrier layer to washing to substantially free the dye from outer portions of the carrier layer each of which outer portions is substantially coextensive with a face of the carrier layer through which light is to be directed and is of substantially uniform thickness to leave a portion of substantially uniform thickness located centrally of the carrier layer between and substantially coextensive with said outer portions and wherein said dye remains unaffected.

OTTO VIERLING.
PAUL GÄNSWEIN.